April 28, 1925.
F. SIEVERN
ANTISKID DEVICE
Filed Aug. 13, 1924
1,535,551
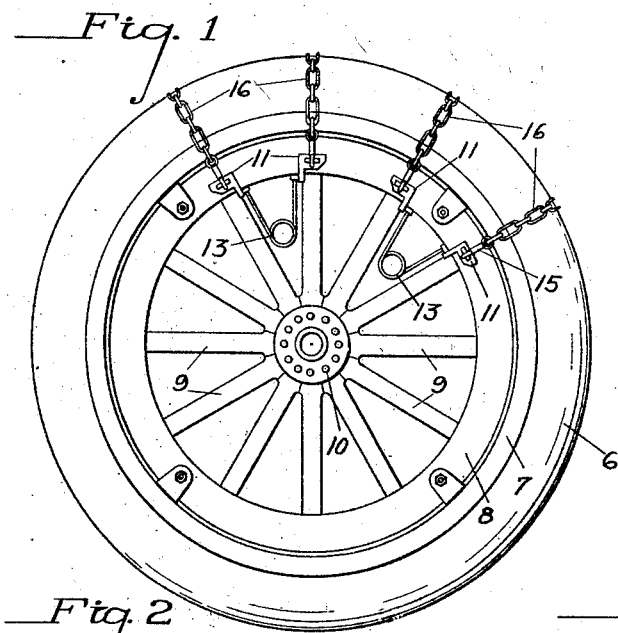
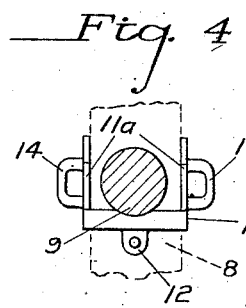
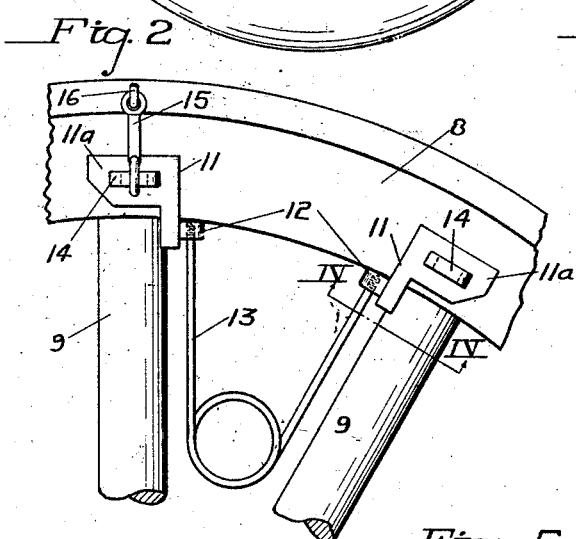
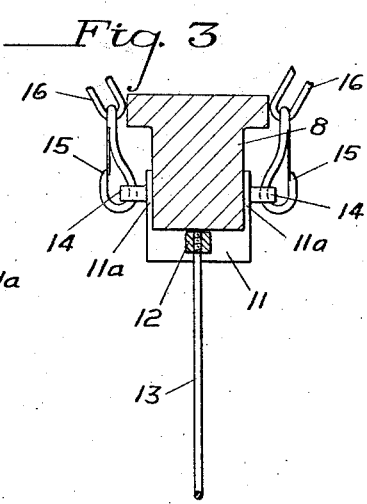
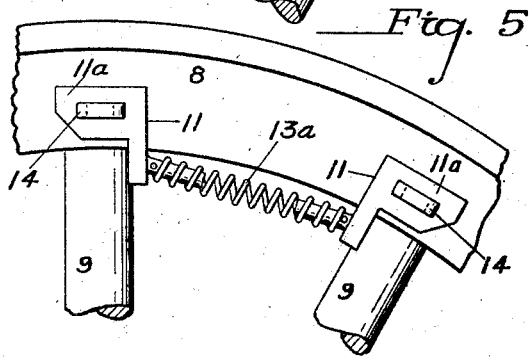
INVENTOR.
Fredrick Sievern
BY Kay, Totten & Martin
ATTORNEYS.

Patented Apr. 28, 1925.

1,535,551

UNITED STATES PATENT OFFICE.

FREDRICK SIEVERN, OF McKEESPORT, PENNSYLVANIA.

ANTISKID DEVICE.

Application filed August 13, 1924. Serial No. 731,814.

*To all whom it may concern:*

Be it known that I, FREDRICK SIEVERN, a citizen of the United States, and resident of McKeesport, in the county of Allegheny and State of Pennsylvania, have invented a new and useful Improvement in Antiskid Devices; and I do hereby declare the following to be a full, clear, and exact description thereof.

My invention relates to anti-skid devices, and particularly to devices applicable to automobile wheels and the like, to prevent skidding thereof.

My invention has for its object the provision of an improved means for supporting cross chains upon wheels, and of such form that either the chains alone may be readily detached or the holding devices therefor readily detached and applied.

My invention also contemplates the provision of a chain-holding device that may be left on the wheel, whether or not tread chains are being employed.

A further object of my invention is to provide antiskid means that may be conveniently applied, without moving the vehicle during the process of application, and even though the vehicle wheel may be partially imbedded in mud or sand. Further, the device may be conveniently applied without the necessity of the operator stepping to the ground.

Some of the forms which my invention may take are shown in the accompanying drawing, wherein Fig. 1 is a view showing an automobile wheel, to which devices embodying my invention are applied; Fig. 2 is an enlarged view of a portion of the structure of Fig. 1; Fig. 3 is a sectional view, on an enlarged scale, of a portion of the structure of Fig. 1; Fig. 4 is a view taken on the line 4—4 of Fig. 2, and Fig. 5 is a view showing a modification of the device of Figs. 1 to 4.

The wheel is provided with the usual tire 6, rim 7, felly 8, spokes 9 and hub 10.

I provide a pair of yoke members 11, adapted to seat against the spokes 9 and having wings 11$^a$ that straddle and seat against the sides of the felly 8. The yokes 11 are provided with lugs 12, within which the ends of a spring 13 are secured preferably by threaded engagement therewith. The spring 13 tends to expand, thereby holding the yokes 11 tightly against the opposing sides of spokes 9. The wing portions 11$^a$ prevent movement of the yokes axially of the wheel.

The wings 11$^a$ are provided with eye lugs 14 for engagement with snap hooks 15 that are carried by the ends of the cross chains 16.

Referring to Fig. 5, I provide a spring 13$^a$ of somewhat different form than the spring 13, but for performing the same function. The manner of application and the functioning of the spring 13 will be clear from an inspection of this figure.

It will be apparent that as many sets of yokes 11 may be applied to a vehicle as desired, and that they may be placed upon the wheel even when such wheel is partially embedded in mud, or the like, and without the operator leaving the runningboard. Further, there are no screws or bolts to be operated in applying or removing the yokes 11 from the wheel. They may be removed as a unit with the cross chains by unhooking one end of each chain, or the cross chains may be removed and the yokes left on the wheel. It will be apparent that even with the chains removed the yokes will remain in position, owing to the tension exerted by the spring, which would prevent their creeping toward the hub of the wheel, in addition to which the centrifugal force of the wheel when moving will tend to hold the yokes against the inner periphery of the felly 8, with the wings 11$^a$ thereof engaging the opposite sides of the felly.

Various other modifications may be made, both in detail and general arrangement, without departing from the spirit and scope of the invention as defined in the accompanying claims.

I claim:

1. An anti-skid device, comprising a pair of circumferentially spaced yoke members, each adapted to engage opposite sides of a wheel, means for yieldingly holding said yoke members against circumferentially fixed opposing surfaces on the wheel, and means for securing cross chains to said yoke members.

2. An anti-skid device, comprising a pair of circumferentially spaced yoke members, each adapted to engage opposite sides of a wheel, anti-skid members for extending across the tread of the wheel and secured to said yoke members, and yieldable means for detachably supporting said yoke members on said wheel.

3. The combination with a vehicle wheel, of an anti-skid device comprising yoke members which straddle the felly of the wheel, and adapted to lie against adjacent spokes, and a spring for holding said yoke members against said spokes.

4. An anti-skid device, comprising two yoke members relatively movable tangentially of a wheel, and adapted to lie between adjacent spokes, and a spring for normally holding said yoke members in expanded positions, the yoke members being adapted to support cross chains.

5. An anti-skid device for vehicle wheels, comprising two chain supporting members adapted to lie between adjacent spokes of a wheel, and means for preventing movement thereof axially of the wheel and for yieldingly maintaining them in engagement with the spokes.

6. The combination with a vehicle wheel of an anti-skid device therefor, comprising yoke members adapted to straddle the felly of the wheel, means for yieldingly maintaining said yoke members in expanded position against adjacent spokes and for maintaining them in their outermost positions radially of the wheel, and means for securing cross chains and the like to said yoke members.

7. An anti-skid device for vehicle wheels comprising a yoke member adapted to straddle the felly of a wheel, means for yieldingly holding said yoke member in its outermost position, and means for securing a cross chain or the like, to said yoke member.

In testimony whereof I, the said FREDRICK SIEVERN, have hereunto set my hand.

FREDRICK SIEVERN.